(12) United States Patent
Fagundo et al.

(10) Patent No.: US 7,624,437 B1
(45) Date of Patent: Nov. 24, 2009

(54) METHODS AND APPARATUS FOR USER AUTHENTICATION AND INTERACTIVE UNIT AUTHENTICATION

(75) Inventors: Arturo Fagundo, Westborough, MA (US); John Bazzinotti, Norwood, MA (US); Peter Davis, Wakefield, MA (US); Andrew Rodwin, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 699 days.

(21) Appl. No.: 10/136,480

(22) Filed: May 1, 2002

Related U.S. Application Data

(60) Provisional application No. 60/369,280, filed on Apr. 2, 2002.

(51) Int. Cl.
*G06F 15/16* (2006.01)
(52) U.S. Cl. .............................. 726/15; 726/3; 726/14; 713/153
(58) Field of Classification Search ................. 713/182, 713/150–155, 168, 153; 726/2–5, 9, 11–15; 709/229, 225, 217–219; 370/229, 230, 401, 370/398; 455/411, 410; 380/255
See application file for complete search history.

(56) References Cited

U.S. PATENT DOCUMENTS

| | | | |
|---|---|---|---|
| 6,092,191 A * | 7/2000 | Shimbo et al. | 713/153 |
| 6,263,447 B1 * | 7/2001 | French et al. | 726/5 |
| 6,311,218 B1 * | 10/2001 | Jain et al. | 709/229 |
| 6,463,474 B1 * | 10/2002 | Fuh et al. | 709/225 |
| 6,606,663 B1 * | 8/2003 | Liao et al. | 709/229 |
| 6,732,105 B1 * | 5/2004 | Watson et al. | 707/10 |
| 6,754,826 B1 * | 6/2004 | Challener et al. | 713/182 |
| 6,763,469 B1 * | 7/2004 | Daniely | 726/11 |
| 7,016,358 B2 * | 3/2006 | Purpura | 370/401 |
| 7,149,896 B1 * | 12/2006 | Bahl et al. | 713/166 |
| 2003/0041136 A1 * | 2/2003 | Cheline et al. | 709/223 |
| 2003/0056092 A1 * | 3/2003 | Edgett et al. | 713/153 |
| 2003/0093563 A1 * | 5/2003 | Young et al. | 709/245 |

\* cited by examiner

*Primary Examiner*—Kimyen Vu
*Assistant Examiner*—Nirav Patel
(74) *Attorney, Agent, or Firm*—Patterson & Sheridan, LLP

(57) ABSTRACT

In a hardware client for remote logon to a network, a two layer authentication protocol enables authorized users to log on while discouraging unauthorized users. The hardware client prevents logging on to the network if the hardware client is stolen. The hardware client itself is authenticated in the first authentication layer in order to establish a link to the network. Then a client computer authenticates in a second layer and further establishes a secure connection to the network. If the power of the hardware client goes off (as it would if or example it were unplugged for transport), then the authentication is not saved and therefore is lost. The hardware client must be reauthenticated before it can be used again.

17 Claims, 6 Drawing Sheets

METHODS AND APPARATUS FOR USER AUTHENTICATION AND INTERACTIVE UNIT AUTHENTICATION

CROSS REFERENCE TO RELATED APPLICATIONS

This application claims the benefit of priority to U.S. Provisional Application Ser. No. 60/369,280, filed Apr. 2, 2002 and entitled "Methods and Apparatus for Operating a Virtual Private Network," the teachings of which are hereby incorporated by reference in their entirety.

FIELD OF THE INVENTION

The present invention relates, in general, to network technologies, and more particularly, to virtual private network (VPN) hardware client devices and methods.

BACKGROUND OF THE INVENTION

Remote access is the ability to log on to a computer network from a "remote" location. Remote does not refer to physical distance, but rather locations that are not part of the configured network.

One conventional form of remote access is the virtual private network (VPN). A VPN is a network constructed by using public wires to connect divergent network nodes. A technique called tunneling enables establishment of the VPN. Tunneling enables one network to send its data via another network's connections. Tunneling encapsulates a first network protocol within packets carried by a second network.

A variety of mechanisms, such as encryption, are used to provide network security for access and data integrity. Another mechanism for network security is the use of authentication, authorization and accounting (AAA) services. AAA services control what computer resources users have access to and track the activity of the users on a network.

Authentication is the process of identifying an individual, usually based on a username and password. Authentication is based on the idea that each individual user will have unique information that sets him or her apart from other users.

Authorization is the process of granting or denying a user access to network resources once the user has been authenticated through the username and password. The amount of information and the amount of services the user has access to depend on the user's authorization level.

Accounting is the process of keeping track of a user's activity while accessing the network resources, including the amount of time spent in the network, the services accessed while there and the amount of data transferred during the session. Accounting data is used for trend analysis, capacity planning, billing, auditing and cost allocation.

Another aspect of network security is a firewall. The firewall is a system designed to prevent unauthorized access to or from a private network. Firewalls can be implemented in both software and hardware or a combination of both. Firewalls are frequently used to prevent unauthorized Internet users from accessing private networks connected to the Internet, especially intranets. All messages entering or leaving the intranet pass through the firewall, which examines each message and blocks those that do not meet the specified security criteria. There are several types of firewall techniques. A packet filter looks at each packet entering or leaving the network and accepts or rejects it based on user-defined rules. An application gateway applies security mechanisms to specific applications, such as FTP and Telnet servers. A circuit-level gateway applies security mechanisms when a TCP or UDP connection is established. Once the connection has been made, packets can flow between hosts without further checking. A proxy server intercepts all messages entering and leaving the network. The proxy server effectively hides the true network addresses. In practice, many firewalls use two or more of these techniques in concert.

When a user logs onto a network remotely, the user is generally logging on through a device called a concentrator. A concentrator is a type of multiplexor that combines multiple channels onto a single transmission medium in such a way that all the individual channels can be simultaneously active. For example, Internet Service Providers (ISPs) use concentrators to combine their dial-up modem connections onto fast T-1 lines that connect to the Internet. Concentrators are also used in local area networks (LANs) to combine transmissions from a cluster of nodes. In this case, the concentrator is often called a hub.

SUMMARY OF THE INVENTION

Current devices and methods of accessing remote networks suffer from a variety of deficiencies. For example, installation and maintenance of software client technology is difficult. Hardware clients are easier to install but introduce network security problems.

A VPN hardware client is a hardware device that enables a user to log on remotely to a network. Generally, the hardware client can be used by more than one user. The hardware client has similarities to a VPN software client, but the hardware client has the advantage of being an external piece of equipment that does not need to be installed on a host computer. In the present invention, the hardware client provides a two level security protocol. The two level protocol provides secure network access to authorized users of the network, provides a link to the Internet without providing access to the network to users who are authorized only for the Internet link, and provides a mechanism for preventing use of the hardware client by those not authorized for such use. The first level of authentication is an authentication of the hardware client itself to the network. After the first level of authentication is established, a user has a link to the Internet without having to pass through the second level of authentication. The second level of authentication is of individual client computers (also referred to as "users") to the network. After the second level of authentication is established, a user on a client computer has access to both the network and the Internet.

Specifically, in one embodiment of the invention, the hardware client delivers user/password information to the head end without storing this information in memory thus, providing secure unit authentication. The head end is the central point where cables originate in a cable distribution system. For this, the hardware client mimics a software client and provides that the username/password be entered manually for each tunnel connection between the hardware client and the remote network.

User authentication then allows each user computer connected to the hardware client to authenticate with the remote network before any packets are passed over the tunnel. Unlike a software client that supports only the computer on which it is loaded, the hardware client of the present invention can act as a front end client for up to 253 users, for example. Without the requirement of user authentication, however, once the tunnel is up in conventional systems, any of those users would be able to access the corporate network. Companies that establish networks, such as VPNs, at the homes of employees have no way of stopping the employee's children (or even worse—unwanted guests) from accessing the corporate network when the tunnel is up. With user authentication, however, the hardware client checks each packet from the connected user computers and allows only those packets from authenticated users to pass through the tunnel.

In the present invention, user authentication allows for the authentication of users on the hardware client such that when an unauthenticated user attempts to access the corporate network over the tunnel, the unauthenticated user is prompted for authentication credentials. In this way, the central site is protected from unauthorized users, such as contractors and family members, on the same LAN as the hardware client from accessing the corporate network.

In addition to the authentication protocol, the hardware client provides an accounting of user connections using, for example, RADIUS accounting. Accounting requires that each of the units/users behind a hardware client are properly accounted for with respect to their login/logout time, and possibly other attributes such as the associated MAC address of the logged in device. This is a more complicated challenge than authenticating users because power failures and the lack of a session logout event make it difficult to account for usage under a session-based paradigm.

More specifically, embodiments of the invention provide methods and apparatus for a hardware client. One such method embodiment comprises authenticating the hardware client to the network, establishing a secure data connection to the network in response to authenticating the hardware client, providing a client computing device authentication mechanism for authenticating at least one client computing device connecting to the network through the hardware client, examining each data request received by the hardware client, and transmitting across the secure data connection only data requests belonging to one of the following types: 1) a data request of a data type to be transmitted without authentication of an originating client computing device, 2) a data request from an authenticated client computing device. In another embodiment of the invention, the authentication method is an authentication table for storing a client computing device identifier. In a first embodiment of the authentication table, the identifier is the media access control (MAC) address of the client computing device. Alternatively, the identifier is the IP address. In a further alternative embodiment of the invention, the identifier is a combination of the MAC address and the IP address. In alternative embodiments of the invention, the authentication information for client computing device is a name and a password. Alternatively, the authentication information is a token.

In another embodiment of the invention, the hardware client enforces disconnect processes in response to client computing device idle time, hardware client idle time, and maximum time for secure connection to the network. The hardware client further includes the ability to accept a disconnect command from the client computing device.

In another embodiment of the invention, data requests having certain data formats, such as voice over IP data, are forwarded without authentication of the client computing device.

In another embodiment of the invention, the method comprises receiving an initial data request from a client computing device. The hardware client then sends a first query for authentication information to the client computing device in response to the initial data request. When the hardware client receives first authentication information in response to the first query, the hardware client verifies the first authentication information and establishes a secure data connection to the network. The hardware client after receiving a second data request from the client computing device, determines whether the second data request is a data type to be transmitted without authentication of the client computing device. If the data type does not require client computing device authentication, the hardware client directs the second data request to a destination outside the network. If the data type does require client computing device authentication, the hardware client determines whether the client computing device is authenticated. If the client computing device is authenticated, the hardware client forwards the packet across the secure data connection to the network. If the client computing device is not authenticated, the hardware client then sends a second query for authentication information to the client computing device, receives second authentication information from the client computing device, verifies the second authentication information, and stores an identifier of the client computing device such that the client is authenticated for subsequent data requests.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

A VPN hardware client (hardware client hereinafter) is a hardware device that enables a user to log on remotely to a network. Generally, the hardware client can be used by more than one user. The hardware client has similarities to a software client but the hardware client has the advantage of being an external piece of equipment that does not need to be installed in a host computer. In the present invention, the hardware client provides a two level security protocol. The two level protocol provides secure network access to authorized users of the network, provides a link to the Internet without providing access to the network to users who are authorized only for an Internet link, and provides a mechanism for preventing use of the hardware client by those not authorized for such use. The first level of authentication is an authentication of the hardware client itself to the network. After the first level of authentication is established, a user has a link to the Internet without having to pass through the second level of authentication. The second level of authentication is of individual client computers to the network. After the second level of authentication is established, a user on a client computer gains access to the network.

Figure 1:
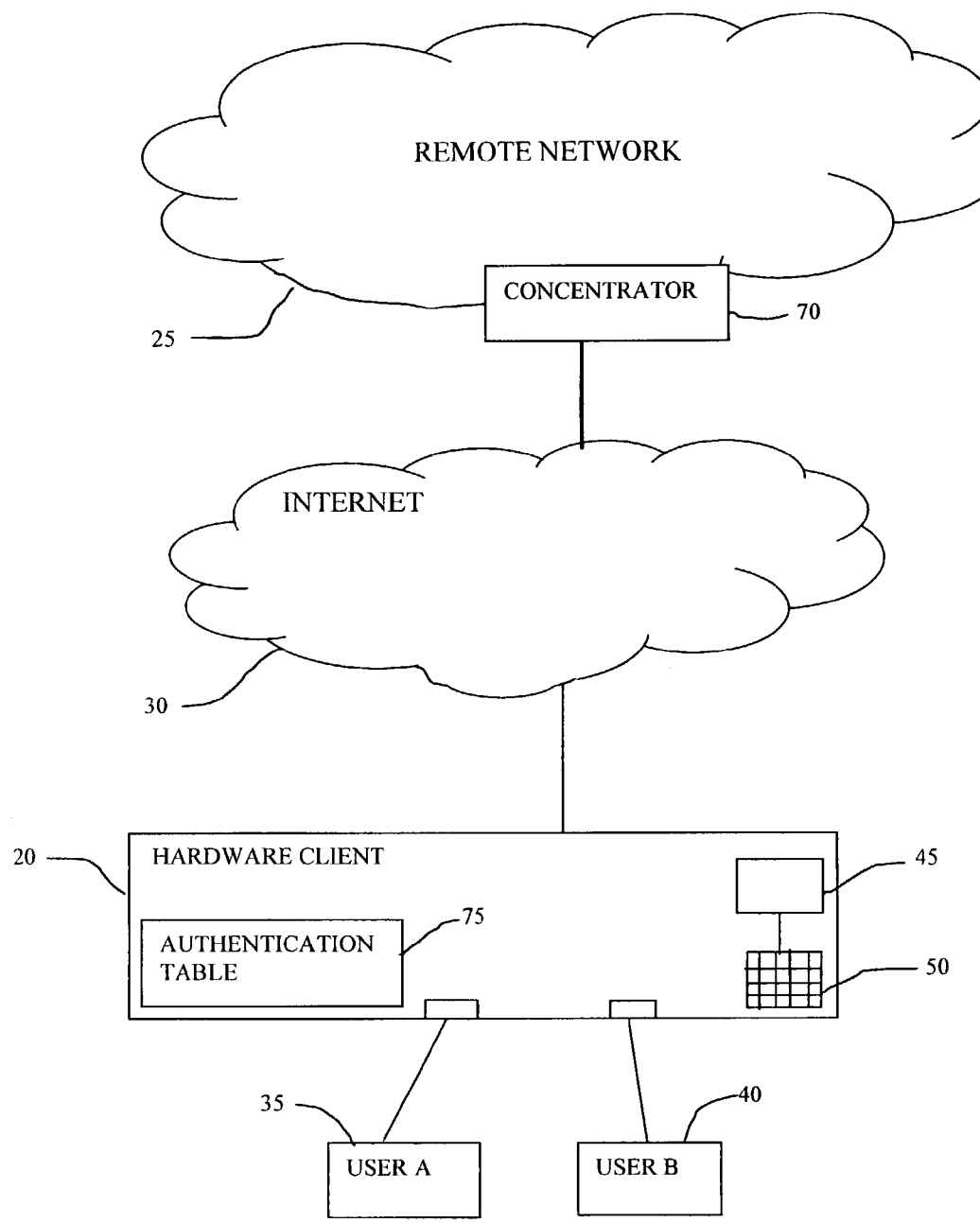
FIG. 1 is a block diagram of the hardware client connecting users to a remote network and the Internet according to principles of the present invention.

FIG. 1 shows the hardware client 20 of the present invention connected to a public network 30 such as the Internet. The public network 30 is connected to a remote network 25 through a VPN concentrator 70. Client computers User A 35 and User B 40 are connected to the hardware client 20. The hardware client 20 has a controller 45, a memory 50 and an authentication table 75. Until the hardware client 20 is authenticated to the remote network 25, the client computers 35 and 40 have no access to either the remote network 25 or the Internet 30. The authentication table 75 stores client computer identifying information.

Figure 2:
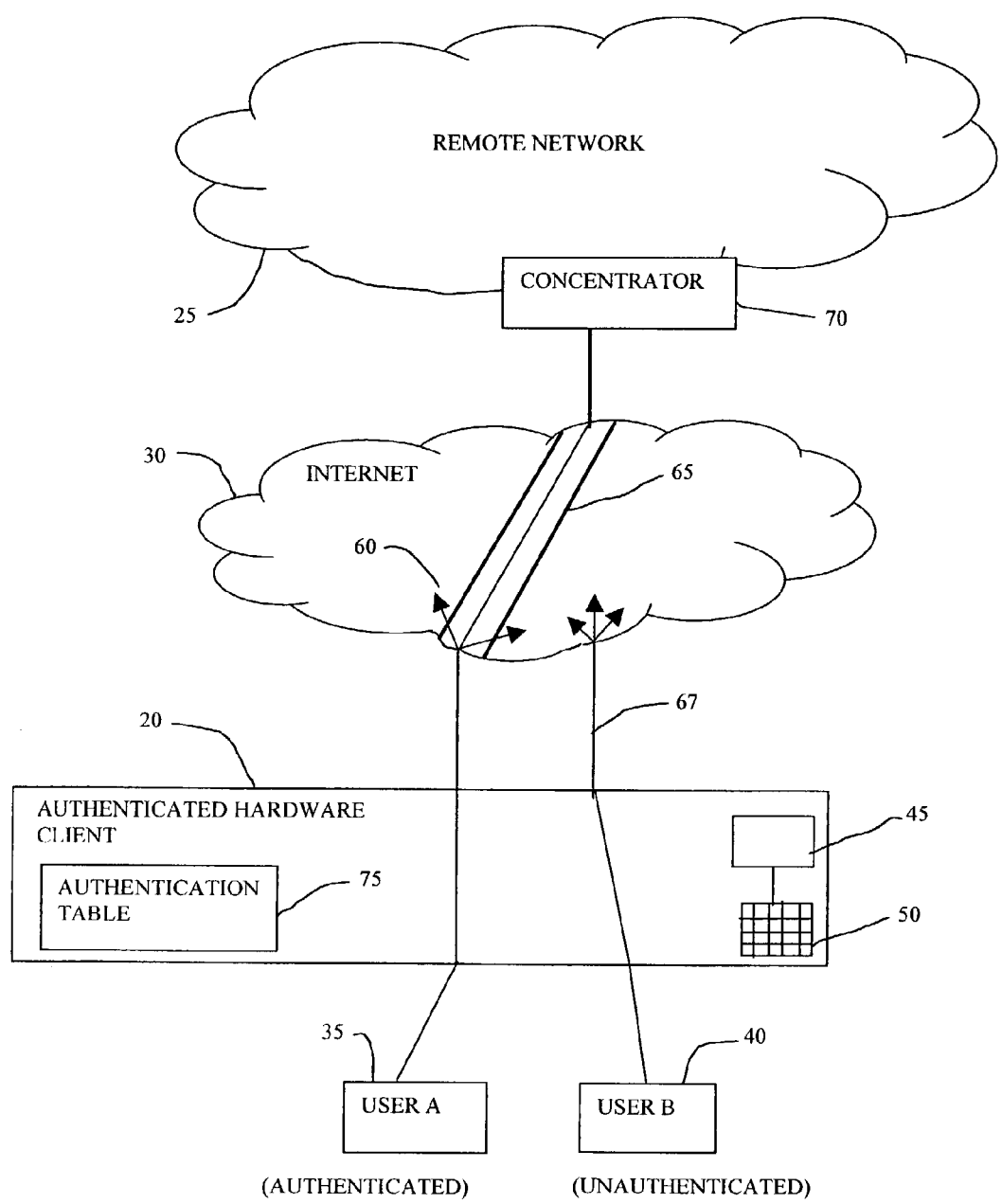
FIG. 2 is a block diagram of the authenticated hardware client of FIG. 1 providing access to the Internet to a non-authenticated user and providing access to the remote network and to the Internet to an authenticated user.

FIG. 2 shows the system of FIG. 1 after authentications have been established. The hardware client 20 has been authenticated to the remote network 25. User A 35 has gone through the process of user authentication. User B 40 has not completed user authentication. For clarity and simplicity, the authentication of the hardware client 20 is referred to as "device authentication" or "hardware client authentication". Individual client computers are also referred to as "users" and authentication of client computers is referred to as "user authentication." Also, data packets may also mean datagrams, data messages, cells or any other data format used in networks.

As a result of the authentication of the hardware client 20, a tunnel 65 between the hardware client 20 and the remote network is established. As an unauthenticated user, User B 40 has access only to the Internet 30, illustrated by Internet link 67. As an authenticated user, User A 35 has access 60 to both the remote network 25 and the Internet 30 as illustrated by the link 65.

Figure 3:
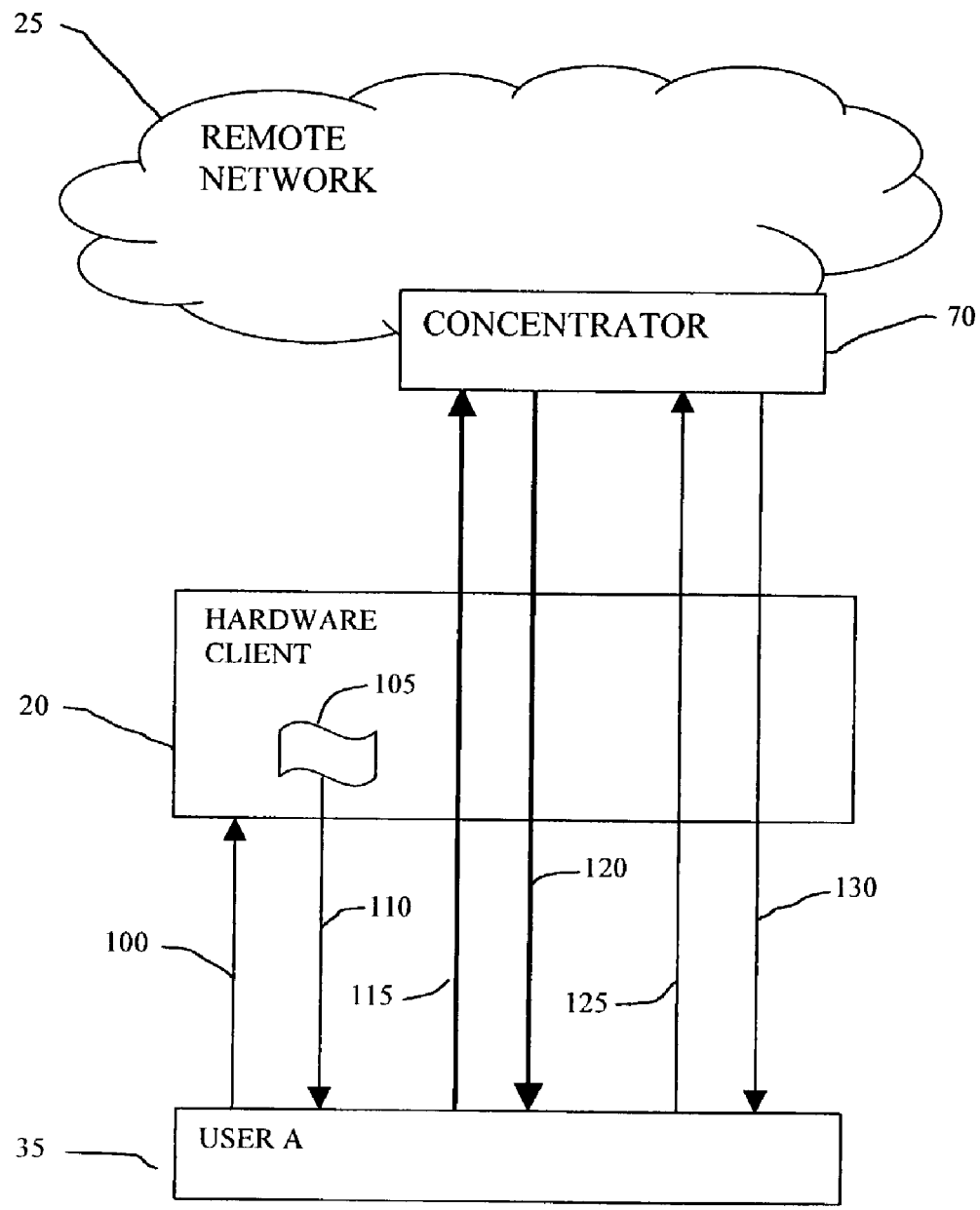
FIG. 3 is a part block diagram, part flow diagram of the processes of authenticating the hardware client and of authenticating a user according to principles of the present invention.

FIG. 3 is a part flow diagram, part block diagram illustrating the processes of hardware client authentication and user authentication to the remote network 25. Such communications take place between the User A 35, the hardware client 20 and a VPN concentrator 70 operating as a gateway or VPN firewall to the remote network 25. The Internet 30 between the remote network 25 and the hardware client 20 is not shown in this example. At the start of the authentication transactions, the tunnel to the remote network 25 is down. When a user, for example User A 35, attempts to access the remote network 25, transaction 100, the hardware client 20 returns a device authentication web page 105, transaction 110. The device authentication web page 105 is stored on the hardware client 20 (e.g., as a web page in firm ware) and is delivered to any user attempting to access the remote network 25 when the tunnel 65 is down. In the present embodiment of the invention, the web page conveys the information (1) that the unit is not currently authenticated, (2) the state of the tunnel to the remote network. In alternative embodiments of the invention, only specific types of transactions, for example web page access, generate a response from the hardware client 20 and packets for other types of action would simply be dropped by the hardware client 20.

User A 35 is requested in the device authentication web page 105 to enter a device username and a device password for the hardware client 20. The device username and device password are passed to the remote network 25 (i.e., to the concentrator 70) for verification, transaction 115. For network security purposes, the device username and the device password are not permanently stored on the hardware client 20 and so must be manually entered each time the tunnel comes up. In an alternative embodiment of the invention, the username is stored but the password is not. Users subsequent to User A 35 do not need to authenticate the hardware client 20 unless the tunnel goes down. After the tunnel goes down, the next user attempting to traverse the tunnel 65 must re-authenticate the hardware client 20. Upon verifying the device username and device password, the remote network 25, in this example, returns an indication that the hardware client 20 is authenticated, transaction 120. In the present embodiment of the invention, the indication that the hardware client 20 is authenticated is a request for user authentication.

Once authentication of the hardware client 20 is completed, the client computer User A 35 must authenticate itself to the remote network 25. User A 35 provides a user name and a user password to the remote network 25, transaction 125. The remote network 25 verifies the user name and the user password and, in this example, returns a verification, transaction 130. The hardware client 20 then makes an entry into the authentication table 75 for the newly authenticated client computer, User A 35.

In the present embodiment of the invention, the authentication table 75 stores the Media Access Control (MAC) address of the client computer 35 when the client computer is authenticated. In alternative embodiments of the invention, other client computer information or combinations of information could be stored. For example, the Internet Protocol (IP) address could be used instead. The MAC address and the IP address in combination could also be used in the authentication table 75. In that implementation, only the source MAC and IP addresses present in the packet which prompted the authentication are accepted. If either is received in combination with a different address (e.g., MAC address paired with a new IP address), the user must re-authenticate.

Figure 4:
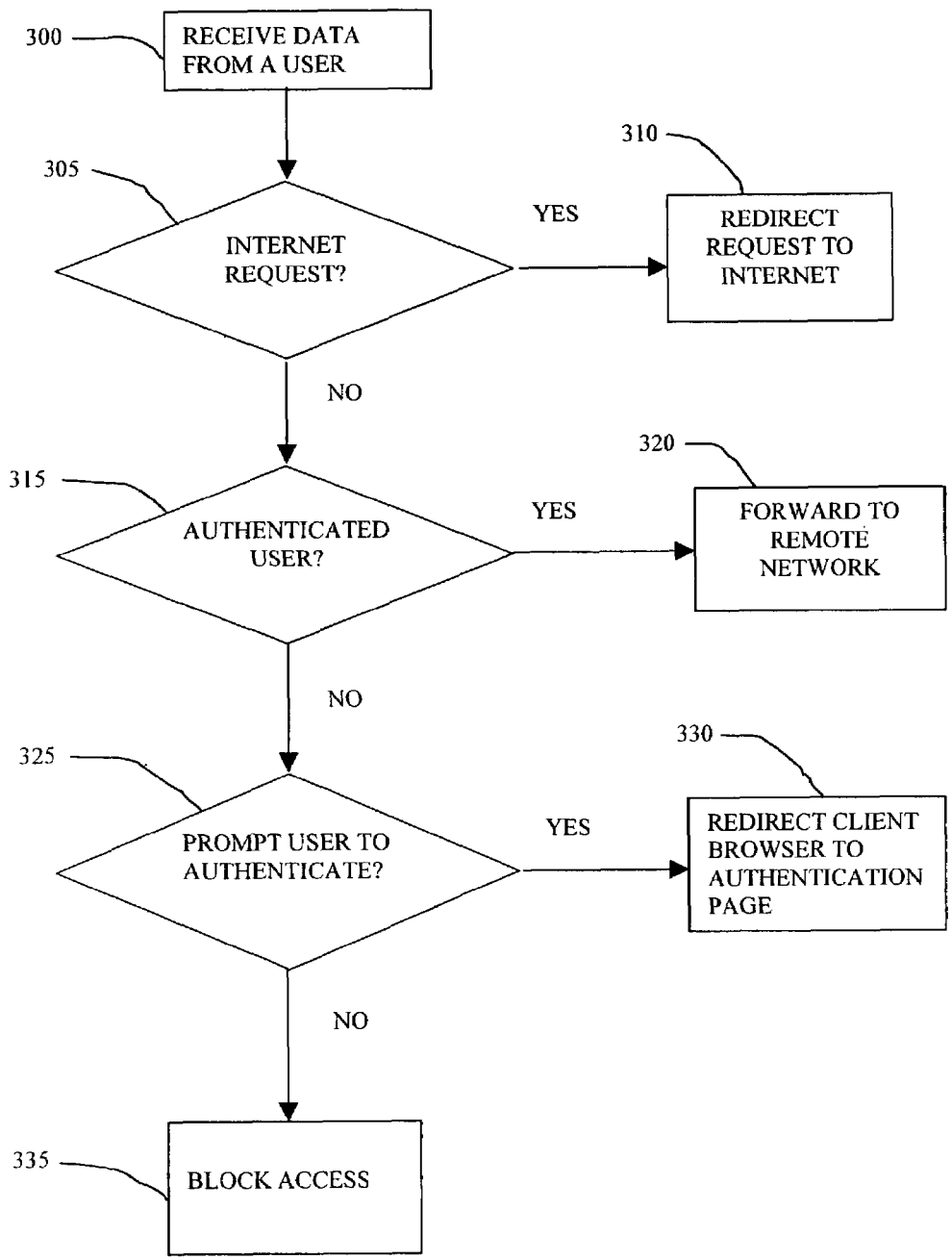
FIG. 4 is a flow chart of the data handling process of the hardware client of FIG. 1.

FIG. 4 is a flow chart showing the process of the authenticated hardware client 20 handling received data. The data handling process of the hardware client 20 requires that each packet received on the interface between client computer 35 and the hardware client 20 be checked to determine if the packet is eligible to cross the tunnel (i.e., over the Internet 30) to the remote network 25. When the hardware client 20 receives data from a client computer 35 in step 300, the hardware client 20 first determines if the data is an Internet request. In step 305, the hardware client 20 makes this determination by looking at the data packet format. If the data is an Internet request, the hardware client 20 redirects the request to the Internet, step 310.

If the data is not an Internet request, the hardware client 20 determines if the data was sent by an authenticated user, step 315. The hardware client 20 makes this determination by performing a lookup in the authentication table. If the date was sent by an authenticated user, the hardware client 20 forwards the data to the remote network, step 320.

If the data was not sent by an authenticated user, the hardware client 20 determines whether to prompt the user to authenticate itself, step 325. In one embodiment of the invention, only web requests receive a return request to authenticate from the hardware client 20. In another embodiment of the invention, the hardware client 20 responds to additional types of data.

If the hardware client 20 determines that the data is of a type prompting authentication, the browser redirects the client browser to the authentication page, step 330. In step 335, if the data request is from an unathenticated user 35 and is not an Internet request and is not a type of data prompting authentication, then access through the hardware client 20 is blocked and the packets of the request are dropped or otherwise rejected.

Figure 5:
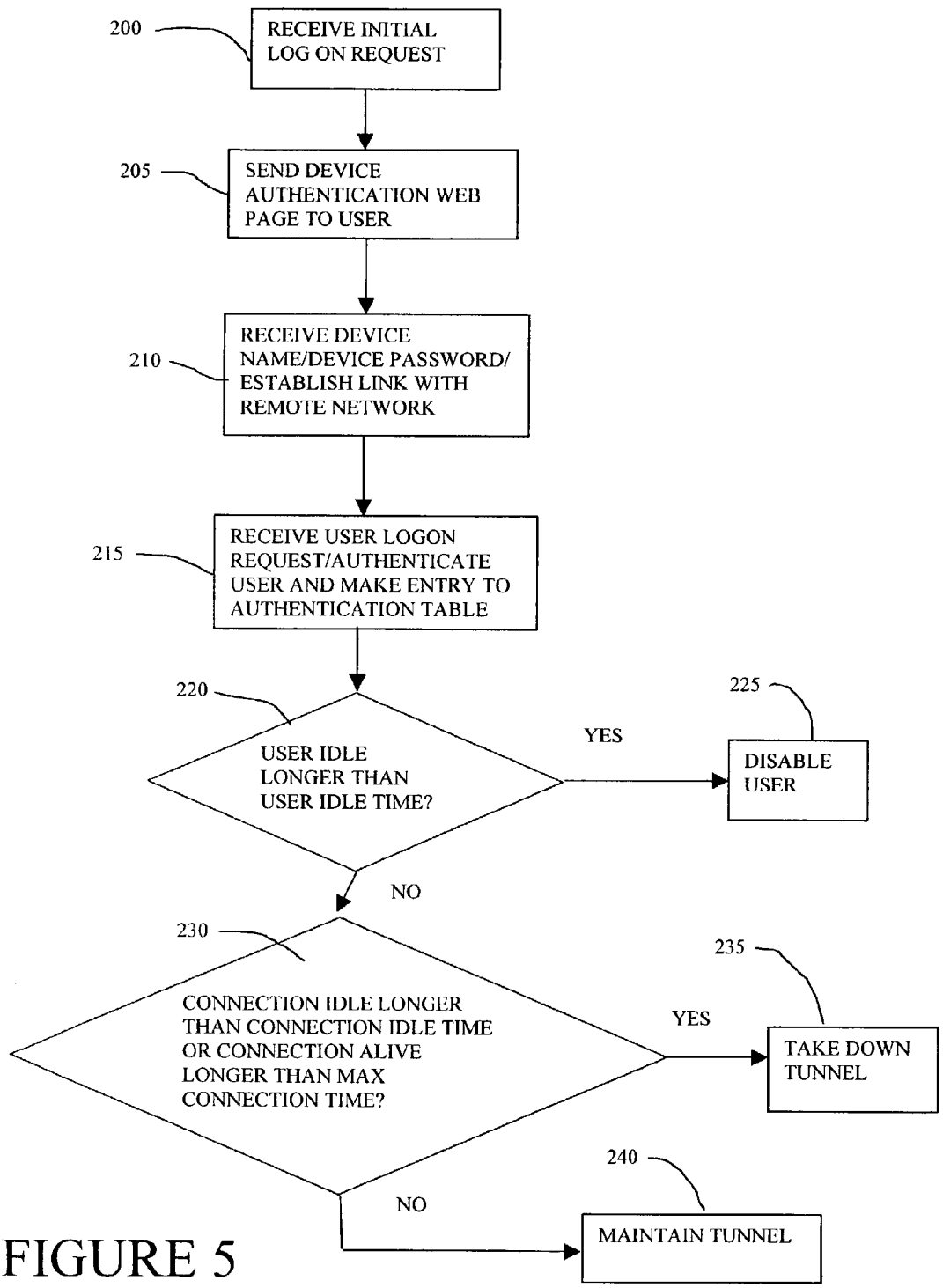
FIG. 5 is a flow chart showing the authenticating processes of FIG. 3 with additional steps of maintaining established connections.

FIG. 5 is a flow chart showing the processes of establishing authentication and of maintaining connections in the hardware client 20. First, in step 200 the hardware client 20 receives an initial log on request from a client computer. In this example, the hardware client 20 has not yet been authenticated and so the hardware client 20, in step 205, sends a device authentication web page 105 to the client computer.

In step 210, the hardware client 20 receives the client computer's response of a device name and a device password and forwards this information 115 to the remote network 25. Upon verification of the device name and device password by the remote network 25, the hardware client 20 is authenticated. The client computer 35 may now access the Internet 30 through the hardware client 20, however, the client computer may not access the remote network itself until the client computer is authenticated.

After device authentication, the hardware client 20 receives a user name and a user password from the client computer. The hardware client 20 prompts for a user name and a password when a request for access to the remote network 25 is received from an unauthenticated client computer 35 as discussed below with regard to FIG. 5. In step 215, the hardware client 20 forwards user information to the remote network 25. Upon receipt of verification of the user name and user password from the concentrator 70, the hardware client 20 makes an entry for the authenticated client computer 35 in the authentication table 75. The client computer is then authenticated and may access both the remote network 25 and the Internet 30 through the hardware client 20.

In this example embodiment, in order to preserve integrity of the remote network 25, the hardware client 20 has an automatic disconnect processes. In step 220, the hardware client 20 determines if the client computer has been idle for longer than a selected user idle time. If the client computer 35 has exceeded the user idle threshold, the client computer 35 is disabled and must re-authenticate in order to access the remote network, block 225. If the client computer has not exceeded the user idle threshold, the authenticated state is maintained. In step 230, the hardware client 20 also determines if the connection between it and the concentrator 70 in the remote network 25 has been idle for longer than a selected connection idle time or if the connection has been alive for longer than a maximum time. In step 235, the connection state meets either of these conditions, then the connection is dismantled, i.e., the tunnel 65 is taken down. If the connection idle time has not been exceeded, then the tunnel is maintained. In addition to the automatic disconnect processes, the hardware client 20 accepts disconnects from the client computers to end authentication. The intention behind the maximum connect time disconnect and the client computer disconnect is the prevention of unauthorized persons from gaining access to the remote network through a still-authenticated client computer whose operator has finished working.

Figure 6:
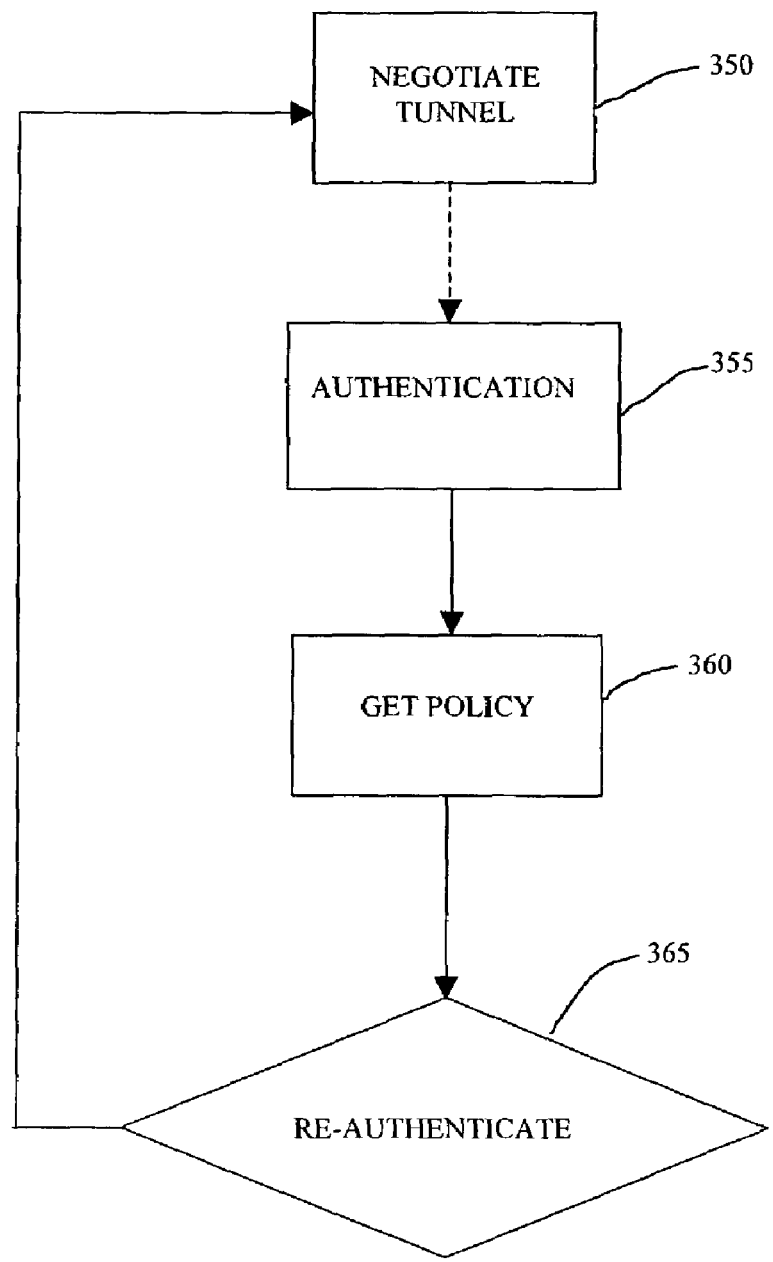
FIG. 6 is a flow chart of an alternative authentication process according to the present invention.

FIG. 6 shows an alternative hardware client authentication process for the present invention. In step 350, the hardware client 20 first negotiates a tunnel 65 to the remote network and provides information for initial authentication, block 355. In step 360 the initial authentication enables the hardware client 20 to retrieve an authentication policy from a remote server such as the VPN concentrator 70. The hardware client 20 re-authenticates using the retrieved policy in step 365, and negotiates a tunnel 65 for data exchange from a now-authenticated hardware client 20 to the remote network 25.

In another alternative embodiment of the invention, Remote Authentication Dial-In User Service (RADIUS) is used for authentication. One model of RADIUS is a proxy authentication method. The user sends in an identifier such as a username and password to a RADIUS proxy server. The proxy server forwards a query to each of a plurality of target servers. Each target server authorizes a piece of the identifier received from the user.

Alternative authentication methods further include tokens. In an example token system, a small device that is typically the size of a credit card displays a periodically changing ID code, or "token". A user first enters a password and then the card displays an ID that can be used to log on to a network. The IDs in a token system change, for example, every five minutes.

Alternatively, a smart card may be used for authentication. A smart card is a small electronic device that is typically the size of a credit card. The smart card includes an electronic memory and can also include an embedded integrated circuit. Smart cards can be used to generate network IDs in a manner similar to a token system. One difference is that the smart card generally requires a smart card reader in order for the ID to be recovered from the card.

Another alternative authentication method is a digital certificate. The digital certificate is generally transmitted as an attachment to an electronic message used for security purposes. The most common use of a digital certificate is to verify that a user sending a message is who he or she claims to be, and to provide the receiver with the means to encode a reply.

An individual wishing to send an encrypted message applies for a digital certificate from a Certificate Authority (CA). The CA issues an encrypted digital certificate containing the applicant's public key and a variety of other identification information. The CA makes its own public key readily available through print publicity or perhaps on the Internet.

The recipient of an encrypted message uses the CA's public key to decode the digital certificate attached to the message, verifies it as issued by the CA and then obtains the sender's public key and identification information held within the certificate. With this information, the recipient can send an encrypted reply.

In a further alternative embodiment, combinations of authentication methods may be used. For example, a token system may be combined with a RADIUS system.

In a still further alternative embodiment, interactive authentication may be used. For example, the authentication process could begin with an initial challenge question. If the user responds correctly, further questions are asked until authentication requirements are satisfied.

In another alternative embodiment of the invention, certain types of data packets would be forwarded to the remote network 25 with no authentication. An example of this type of data is voice over IP data. The hardware client would add another step to the process of examining incoming data packets. If the data packet was identified as exempt from authentication, the hardware client would forward the packet to the remote network.

In another embodiment of the invention, the hardware client 20 is configured to block access to the Internet for unauthenticated users.

Another alternative embodiment of the invention includes accounting functionality where, for example, the following accounting attributes are forwarded to an accounting server on the remote network from the hardware client: the user, the time the user logged in, the time the user logged out, the user's MAC address, and the user's IP address. The central site server may need to keep track of authenticated users if this is the only way that an authentication and accounting server could properly be reconciled in case of a hardware client failure/central-site or abnormal disconnect.

In a further alternative embodiment of the invention, information about hardware client users is stored as part of the existing session database, or in a new database. The purposes of this would be 1) to enable accounting, and 2) because network administrators may wish to be able to monitor hardware client users on a particular concentrator.

Alternative embodiments of the authentication web page could further include, in addition to authentication status and tunnel status, an interactive portion enabling client computer authentication, a client computer disconnect portion, a configuration portion for administrators, and an impending automatic disconnection warning. The authentication web page would provide connection information, tunnel status and authentication status regardless of whether the hardware client or the client computer was authenticated.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a VPN authentication system that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a VPN authentication system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method, comprising:
   establishing a connection between a virtual private network (VPN) hardware client and an internet;
   establishing a connection between a client computer and the internet, where the connection passes through the VPN hardware client;
   establishing a tunnel between the client computer and a remote network upon successfully authenticating the virtual private network (VPN) hardware client to the remote network, where the VPN hardware client is operably connected to and remote to the client computer, and where the VPN hardware client is a hardware device,
   where authenticating the VPN hardware client comprises:
   receiving an initial data request from a client computing device;
   sending a web page containing a first query for authentication information to said client computing device in response to said initial data request;
   receiving first authentication information in response to said first query; and
   verifying said first authentication information, and wherein the step of providing the client computing device authentication mechanism comprises:
   returning, in response to verifying the first authentication information, a web page containing a query for client authentication information to said client computing device, the web page including information about the status of the secure data connection;
   receiving client authentication information from said client computing device; and
   verifying said client authentication information;
   controlling the VPN hardware client to provide two different levels of access to a user of the client computer, where a first level of access provides access to the internet to an unauthenticated user of the client computer, and where a second level of access provides access to both the internet and to the remote network to a user of the client computer that has been authenticated to the remote network through the tunnel;
   examining all data requests received by the VPN hardware client both before the VPN hardware client has been authenticated to the remote network and after the VPN hardware client has been authenticated to the remote network; and
   selectively allowing data requests seeking access to the tunnel, where data requests seeking access to the tunnel will be granted access to the tunnel when the data requests are either data requests that do not require that they originate from an authenticated user of the client computer or are data requests from an authenticated user of the client computer.

2. The method of claim 1, comprising storing an identifier for an authenticated client computer in an authentication table.

3. The method of claim 1, comprising:
   monitoring tunnel idle time; and breaking down the tunnel when the monitored tunnel idle time exceeds a network connection idle time threshold.

4. The method of claim 1, where an Internet data type is to be allowed access to the tunnel without being associated with an authenticated user of the client computer.

5. The method of claim 1, where a voice-over-Internet-Protocol type is to be allowed access to the tunnel without being associated with an authenticated user of the client computer.

6. The method of claim 1, comprising:
monitoring client computer idle time; and
deauthenticating the client computer when the monitored client computer idle time exceeds a client computer idle time threshold.

7. The method of claim 1, where client authentication information is accessible in a smart card and where authenticating the client computer comprises reading the client authentication information from the smart card.

8. A method of making a secure connection between a virtual private network (VPN) hardware client and a network, comprising the steps of:
A. receiving, at the hardware client, an initial data request from a client computing device;
B. sending a first query for authentication information from the hardware client to said client computing device in response to said initial data request;
C. receiving, at the hardware client, first authentication information in response to said first query;
D. verifying said first authentication information;
E. establishing a secure data connection from the hardware client, over a public network, to the network in response to verifying said first authentication information, wherein the secure data connection includes a tunnel between the hardware client and the network;
F. receiving a second data request from said client computing device;
G. determining whether said second data request is a data type to be transmitted without authentication of said client computing device;
　a) if yes, directing said second data request to a destination outside said network;
　b) if no, determining whether said client computing device is authenticated;
　　i) if yes, forwarding the packet across said secure data connection to said network, wherein the packet travels over the tunnel;
　　ii) if no, sending a second query for authentication information to said client computing device;
　　　(1) receiving second authentication information from said client computing device, wherein said second authentication information is transmitted over the network;
　　　(2) verifying said second authentication information;
　　　(3) storing an identifier of said client computing device such that said client is authenticated for subsequent data requests;
wherein the method further comprises:
examining each data request received by the hardware client prior to authenticating the hardware client to the network and examining each data request received by the hardware client post authenticating the hardware client to the network.

9. The method of claim 8 wherein the step of determining further comprises an authentication table lookup.

10. The method of claim 8 wherein said step of storing an identifier further comprises storing said identifier in an authentication table.

11. The method of claim 8 wherein said stored identifier is a MAC address of said client computing device.

12. The method of claim 8 wherein said stored identifier is a MAC address and an IP address of said client computing device.

13. The method of claim 8 wherein said data type to be transmitted without authentication is an Internet data request type.

14. A circuit, comprising:
a data communications port;
a memory;
an authentication table; and
a controller coupled to said data communications port, said memory and said authentication table, said controller being configured to:
authenticate to a network;
establish a secure data connection over a public network, the secure data connection including a tunnel between a virtual private network (VPN) hardware client and the network, in response to authenticating;
provide a client computing device authentication mechanism for authenticating at least one client computing device connecting to the network via the tunnel through the hardware client, wherein the client computing device authentication mechanism comprises:
　sending a query for client authentication information to said client computing device;
　receiving client authentication information from said client computing device, wherein said client computing device transmits said client authentication information over the network;
　verifying said client authentication information; and
　storing an identifier of said client computing device such that said client is authenticated;
examine each data request received at said data communications port prior to authenticating the hardware client to the network and examining each data request received by the hardware client post authenticating the hardware client to the network;
determine whether said data request originated from a client computing device having an identifier stored in said authentication table; and
transmitting across said secure data connection only data requests belong to one of the following types: 1) a data request of a data type to be transmitted without authentication of an originating client computing device, 2) a data request from an authenticated client computing device.

15. The method of claim 8, where the step of sending a first query comprises sending a web page containing a first query for authentication information from the hardware client to said client computing device in response to said initial data request, and wherein the step of sending a second query for authentication information comprises sending a web page containing a second query for authentication information to said client computing device, wherein the web page containing a second query for authentication information includes information about the status of the secure data connection.

16. The method of claim 1 comprising:
detecting that the established connection is down;
re-authenticating the hardware client to the network; and
establishing a new secure data connection over a public network, the new secure data connection including a tunnel between the hardware client and the network, in response to re-authenticating the hardware client.

17. The method of claim 8 comprising:

detecting that the secure data connection is down;

sending a first query for authentication information from the hardware client to said client computing device in response to the detection;

receiving, at the hardware client, first authentication information in response to said first query;

verifying said first authentication information; and re-establishing a secure data connection from the hardware client, over a public network, to the network in response to verifying said first authentication information, wherein the secure data connection includes a tunnel between the hardware client and the network.

* * * * *

UNITED STATES PATENT AND TRADEMARK OFFICE
CERTIFICATE OF CORRECTION

PATENT NO. : 7,624,437 B1  Page 1 of 1
APPLICATION NO. : 10/136480
DATED : November 24, 2009
INVENTOR(S) : Fagundo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1056 days.

Signed and Sealed this

Twenty-first Day of December, 2010

David J. Kappos
*Director of the United States Patent and Trademark Office*